Patented Nov. 21, 1944

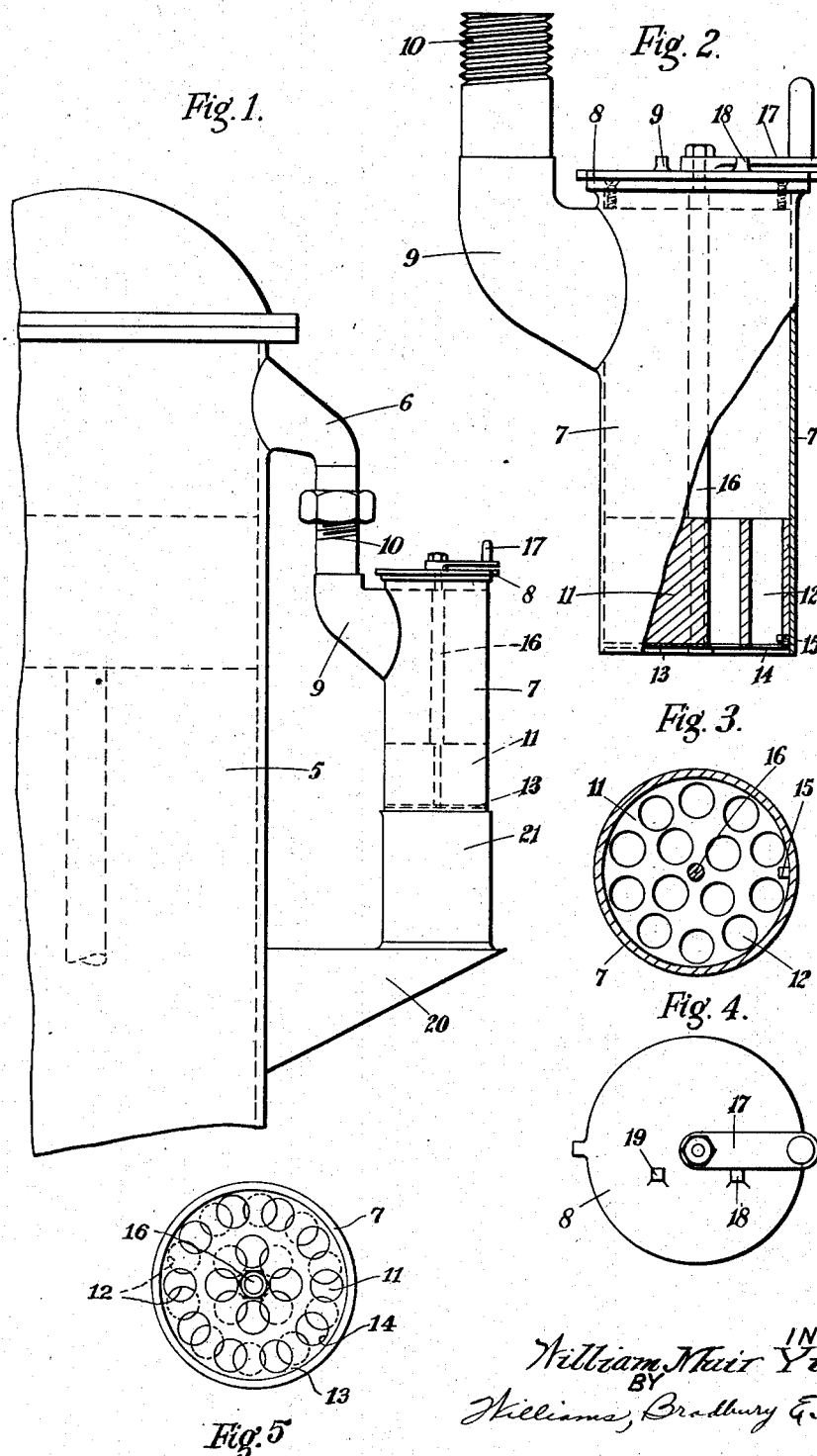

2,363,218

UNITED STATES PATENT OFFICE 2,363,218

APPARATUS FOR CANNING SKINLESS SAUSAGES

William Muir Yuill, Edinburgh, Scotland

Application September 5, 1941, Serial No. 409,670
In Great Britain May 29, 1941

4 Claims. (Cl. 17—32)

This invention is concerned with the preservation of foodstuffs in cans and like receptacles and particularly with apparatus for attachment to meat presses or for attachment to presses for other plastic food substances or food preparations, the object of the present invention being to enable the meat or other food substance to be packed into cans or like containers in the form of skinless sausages, a plurality of such sausages being accommodated in each can or like container.

Although the term "sausage" is generally used to denote an article consisting principally of minced meat enclosed in a thin casing or skin, it is to be understood that the word "sausage" is used herein to define any food substance or food preparation formed into rod shape, whether circular, oval or other shape in cross-section.

The apparatus of the present invention comprises a cylindrical or other suitably shaped filler casing closed at one end except for the provision of an inlet branch for attachment to the outlet connection of a meat or like press, the portion of the casing remote from the said inlet branch containing a plurality of parallel tubular passages arranged longitudinally in the casing and dividing the interior of the casing into an inlet chamber for the sausage meat or other plastic food substance and a tube chamber containing tubes which can be charged with the meat or other food substance from the inlet chamber, the tubes being adapted to deliver the meat or other food substance in the form of skinless sausages to cans or like containers which can be fitted to the delivery end of the filler casing to receive the sausages, and associated with the filler casing is a cutter adapted to sweep across the delivery end of the casing to sever the sausages when each can or like container has been filled.

My invention results in the can or like container being filled with a plurality of skinless sausages, the spaces between which may be filled with molten lard or any other suitable liquid food preservative or seasoning. The sausages are also all of even and uniform shape.

The accompanying drawing illustrates as an example one form of apparatus according to my invention, Fig. 1 being a fragmentary front view of a meat press having my apparatus attached. Fig. 2 is a front view to a larger scale of the apparatus removed from the meat press; the view shows part of the filler casing and tube block in section. Fig. 3 is a transverse sectional view showing the tube block. Fig. 4 is a plan view of the cover for the filler casing. Fig. 5 is a bottom plan view of the filler casing with the cutter 13 shown just after the start of a cutting operation.

In the example illustrated I have shown a vertical meat press 5 having a lateral outlet branch 6. The attachment illustrated comprises a cylindrical metal filler casing 7 having an end cover 8 which is tightly fitted to prevent leakage. The side of the casing 7 is provided with a lateral inlet branch 9 screw-threaded at 10 for attachment to the lateral outlet branch 6 of the meat press 5 so that the filler casing 7 is suspended in a vertical position at the side of the meat press with the end cover 8 closing the upper end of the casing 7. Inside the filler casing 7 and below the inlet branch 9 is a block 11 formed with a plurality of parallel vertical tubular passages 12 opening through both ends of the block 11. Below the block 11 is an apertured cutter disc 13 having apertures 14 equal in number to and adapted to register with the tubular passages 12. The block 11 is cylindrical and snugly fits the casing 7 and to prevent rotation of the block 11, the latter has a notch or recess which engages a lug 15 projecting from the casing 7. To support the block 11 and cutter disc 13 in the lower part of the casing 7, the upper face of the block 11 bears against a shoulder formed by a reduced portion of a central vertical spindle 16, which passes freely through a central hole in the block 11. The lower end of the spindle 16 is screw threaded to receive a nut whereby the cutter disc 13 is secured to the spindle 16, so that turning of the spindle 16 will rotate the cutter disc 13 against the lower face of the block 11. The upper end of the spindle 16 is fitted with a crank handle 17 movable through 180 degrees from the position shown in Fig. 4 from a position in which it abuts against a stop 18 on the cover 8 until it abuts against a second stop 19 on the cover 8. A bracket or other suitable support 20 is provided on the meat press 5 at a suitable distance below the filler casing 7 to receive and support a can or other container 21 which is to be filled with skinless sausages.

It will be apparent that the meat or other food substance delivered by the press 5 through the outlet branch 6, enters the upper part of the filler casing 7 through the lateral branch 9 and is forced through the passages 12 in the form of skinless sausages which are delivered into the container 21. When the desired length of sausage has been delivered, the crank handle 17 is reciprocated to cause the cutter disc 13 to sever the sausages. In this manner cans or like containers can be successively and rapidly filled with skinless sausages all of even and uniform shape. The cross-sectional shape of the sausages will depend upon the shape of the tubular passages 12 which may be either cylindrical as shown or of any other desired shape.

Instead of the apparatus being vertically arranged as shown in the drawing, the meat press and/or the filler casing 7 may be disposed horizontally or in an inclined position.

When a can 21 is fitted to the delivery end of the filler casing 7, the pressure of the meat forced through the block 11 causes skinless sausages to be delivered into the can 21 until the desired length of sausage is cut off by operating the handle 17 to move the cutter 13 across the delivery end of the passages 12 in the block 11.

Having described my invention, it will be apparent to those skilled in the art that changes and modifications may be made without departing from the spirit and scope thereof. I, therefore, wish to be limited only by the appended claims.

What I claim as new and desire to secure by United States Letters Patent is:

1. Means for filling a receptacle with a plurality of casingless sausages from a food press comprising a vessel open at one end and having a chamber at its other end adapted for connection to the interior of the food press, a meat divider filling a portion of said vessel at the open end thereof, the end face of said meat divider being similar in size and shape to the open end of the receptacle to be filled, a plurality of parallel open-ended passages extending through said divider in the direction of its axis, a central spindle extending axially through said vessel and rotatable in an axial passage through said divider, a cutter fixed to one end of said spindle and movable across the outer end face of said divider, means for turning said spindle, and means for supporting the receptacle with its rim held against the surrounding rim forming the open end of said vessel.

2. Means for filling a plurality of casingless sausages directly into a receptacle from a food press, comprising a cylindrical vessel open at one end, the internal diameter of said vessel being equal or almost equal to the internal diameter of the receptacle to be filled, an inlet branch opening into said vessel at its closed end and adapted for attachment to an outlet branch on the food press, a meat divider filling a portion of said vessel at the open end thereof, said meat divider having a plurality of parallel tubular passages extending therethrough in a direction parallel to the axis of the vessel, a cutter disc movable over the outer end face of said divider, said cutter disc having apertures equal in number and shape to the number and cross-sectional shape of the outer ends of said passages, means for turning said cutter disc, and means for supporting the cylindrical receptacle with its rim against the rim at the open end of said vessel and with its axis in alignment with the axis of the vessel.

3. Means for filling a receptacle with a plurality of casingless sausages from a food press, comprising a vessel having an open delivery end adapted to fit the can or container to be filled and having a chamber at its other end adapted for connection to the interior of the food press, a meat divider filling a portion of said vessel at the open end thereof, a plurality of parallel open-ended passages extending through said divider in the direction of its axis, a central spindle extending axially through said vessel and rotatable in an axial passage through said divider, a cutter fixed to one end of said spindle and movable across the outer end face of said divider, means for turning said spindle, and means for supporting a can or container with its open end fitted to the open end of said vessel.

4. Means for filling sausages directly into a cylindrical can from a food press comprising a cylindrical vessel closed at one end and open at its other end, the open end of said vessel being adapted to fit the can to be filled, an inlet branch opening into said vessel at its closed end and adapted for attachment to an outlet branch on the food press, a meat divider filling a portion of said vessel at the open end thereof, said meat divider having a plurality of parallel tubular passages extending therethrough in a direction parallel to the axis of the vessel, a cutter disc movable over the outer end face of said divider, said cutter disc having apertures equal in number and shape to the number and cross-sectional shape of the outer ends of said passages, means for turning said cutter disc, and means for supporting a cylindrical can with its open end fitted to the open end of said vessel and with its axis in alignment with the axis of the vessel.

WILLIAM MUIR YUILL.